3,232,893
FOAMED POLYESTER-MALEIC ANHYDRIDE COMPOSITIONS AND METHOD OF MAKING THE SAME
Alvaro Salgado, Colombia, N.J., and Ismar Berlinger, Brooklyn, N.Y., assignors to Reichhold Chemicals, Inc., Detroit, Mich.
No Drawing. Filed June 27, 1962, Ser. No. 205,572
11 Claims. (Cl. 260—2.5)

The present invention relates to foamable resin compositions comprising as main constituents unsaturated polyester resins and maleic anhydride or maleic acid and to the method of making the same.

More particularly the invention, in its specific embodiment, relates to the production of a formable resin composition of the character described wherein a vaporizable inert oragnic blowing agent is employed, preferably a normally liquid blowing agent such as "Freon," having a boiling point between 20 and 60° C., and wherein the exothermic heat of the reaction between the constituents of the foamable resin composition is sufficient to vaporize the blowing agent without the necessity for using external heat.

The resultant product is a very hard thermoseting foam with excellent strength properties and other features which will become apparent from the following descriptions. The unsaturated polyester and maleic anhydride are well known in the art and are commercially available.

Most of the foams now in use are derived from thermoplastic polymers. Their inherent shortcomings, that of melting at their respective softening points limits their applicability.

It is an object of this invention to provide an improved room temperature curable foam resin composition which is extremely tough, durable, has good adhesion to many substrates and which has good cell structure situated throughout the foamed mass. When in its final cured form, this foam is infusible and has a high heat distortion temperature. The material is especially suited for situations requiring "foamed-in-place" resins, i.e. to fill varied shaped voids with foam for encapsulating or insulating purposes at room temperature of if desired at elevated temperatures also.

A particular object of this invention is to provide a foam which does not require expensive apparatus to provide for foam expansion.

It is a further object of the invention to provide a foam which has a controllable expansion, cell size, and open to closed cell ratio, within some limitations, by changes in the maleic-polyester ratio and the amount of blowing agent introduced into the system.

It is still a further object to provide a foam which will not exhibit "post-expansion shrinkage."

The foam may be rendered fire resistant or retardant by the incorporation of a flame retardant in the polyester or monomer or combination thereof. Such flame retardant additives are known to the art, i.e. phosphorous, antimony or halogenated compounds also aid in attaining an adequate level of flame inhibition. Another method of imparting flame retarding characteristics is set forth in our application Ser. No. 170,304, filed Jan. 16, 1962.

A promoted polyester resin sets some time after initiator addition forming a mass of gelatinous consistency. As is known to those skilled in the art, a room temperature catalyzed polyester resin will emit appreciable heat only after gelation already occurred. Upon gelation of the polyester, the physical shape of the set resin cannot be altered without actual rupturing and tearing. It is an object of this invention to prepare a foamed polyester resin which, while requiring heat to institute foaming, does not evolve appreciable heat prior to gelation.

This invention comprises the method of preparation and product of polyester foam composition relying on the useful qualities of maleic anhydride or its equivalent.

Advantage is taken of the more reactive nature of maleic anhydride per se than its esterified form in the polyester chain. Maleic anhydride is known to react with styrene with explosive violence when peroxide initiated. In the foam context the two species of maleic react at different rates with styrene, the hindered or esterified maleic being slower to react than the uncombined maleic anhydride. The maleic anhydride component which is compatible in the foam mixture evolves considerable heat when reacted with styrene monomer and a polyester catalyst. This heat results in vaporizing the blowing agent and inducing a foam expansion.

While maleic anhydride is preferred, it may be substituted in whole or in part by maleic acid or monoester of maleic acid, or mixtures thereof, without departing from the invention in its broadest aspects. Fumaric acid and its monoesters may likewise be used for this purpose. The ratio of the unsaturated ester resin composition including the monomer, with reference to the maleic anhydride or its equvalent may be varied within wide limits, the preferred weight ratio of unsaturated resin to maleic anhydride or its equivalent being between about 95:5 to about 70:30. Thus the quantity by weight of the polyester is preferably substantially in excess of the quantity by weight of the maleic anhydride or its equivalent.

The polyester portion of the foam comprises a mixture of (a) the reaction products of one or more dihydric aliphatic alcohols with one or more dicarboxylic acids wherein at least one member contains alpha beta ethylenic unsaturation and (b) one or more polymerizable monomers or cross-linking agents containing carbon to carbon unsaturation.

A suitable polyester for use as the polyester portion of the composition is described in our application Serial No. 188,555, filed April 18, 1962, entitled "Foamed Polyester Epoxide Resin Compositions and Method of Making Same," wherein the foamed composition is formed from a polyester portion and an epoxy portion with the acid of a suitable vaporizable blowing agent.

Polyesters are usually made by esterifying, at elevated temperatures, polyhydric alcohols and alpha beta ethylenically unsaturated dicarboxylic acids until an acid number of about between 5 and 80, and preferably, between 20 and 50 is reached, whereupon the resultant unsaturated alkyl is blended with a stabilizer and a polymerizable monomer or cross-linking agent having at least one —C=CH$_2$ group. The weight ratio of the alkyd to the monomer be varied between 95:5 and 5:95.

Depending upon the kind of monomer and upon the behavior of the alkyd, the preferred weight ratio is generally between about 55 alkyd to 45 monomer and about 85 alkyd to 15 monomer, the quantity of the alkyd being preferably substantially in excess of the monomer.

The said dihydric alcohols considered as starting materials or as reactants for the alkyd reaction include saturated and unsaturated aliphatic glycols, such as ethylene glycol, propylene glycol-1,2, propylene glycol-1,3, butylene glycol-1,2, butylene glycol-1,4, pentane diol-1,5, the hexylene glycols, neopentyl glycol-1,2-butene-1,4-diol, 2-methyl-3-butyn-2-ol, 3-methyl-1-pentyn-3-ol, etc. They also include dihydroxy polyethers, such as diethylene glycol, dipropylene glycol, triethylene glycol and also the higher polyglycols of waxy consistency, which latter are called commercially "Carbowaxes."

Also, cycloaliphatic diols, such as 1,1-isopropylidene dicyclohexanol (hydrogenated bisphenol) may be utilized in the preparation of the alkyd. The ethylenically unsaturated alpha beta dicarboxylic acids considered as starting materials include maleic acid, fumaric acid, aconitic acid, itaconic acid, mono-chloromaleic acid, etc., and mixture thereof, and the corresponding anhydrides of the cis-acids and mixtures thereof. These ethylenically unsaturated dicarboxylic acids may be partially replaced with either saturated carboxylic acids or those dicarboxylic acids which contain only benzoid unsaturation. This group includes adipic acid, azelaic acid, sebacic acid, dimerized fat acids, phthalic acid, tetrahydrophthalic acid, tetrachlorophthalic anhydride, hexahydrophthalic acid, etc. or mixtures thereof, as well as the anhydrides of those acids which are capable of forming it. Up to ten mols of these dicarboxylic acids having no ethylenic unsaturation may be used per each mol of ethylenically unsaturated dicarboxylic acid. The preferred mol ratio of ethylenically unsaturated dicarboxylic acid to dicarboxylic acid containing no unsaturation other than benzenoid is between about 5:1 and 1:5.

These group of polymerizable monomers which may be employed in the polyester composition includes the vinyl monomers, such as styrene, vinyl toluene, diallyl phthalate, triallyl cyanurate, triallyl citrate, diallyl maleate, diallyl fumarate, the isomers of dichlorostyrene, etc and mixtures thereof. The group further includes methyl methacrylate, ethyl ethacrylate, methyl acrylate, ethyl acrylate, etc. and mixtures thereof.

In order to prevent gelation during manufacture and storage, the unsaturated polyester resin composition must be stabilized using any suitable stabilizer. Some of the well-known stabilizers which may be used are of the phenolic or quinoid type and include hydroquinone, quinone, tertiary, butyl catechol, etc. and mixtures thereof, and others such as quaternary ammonium salts, esters of phosphorus acid, copper salts, gaseous oxygen, etc. and mixtures thereof.

The unsaturated polyester resins may be cured to insoluble and infusible copolymers by the use of any suitable curing agents or catalysts such as organic and inorganic peroxides and hydroperoxides, such as benzoyl peroxide, methyl ethyl ketone peroxide, cyclohexanone peroxide, hydrogen peroxide, lauroyl peroxide, tertiary butyl perbenzoate, diacetyl peroxide, cumene hydroperoxide, etc., and mixtures thereof. For even faster cure the curing agent, i.e. peroxides may be used in various combinations, and also in the presence of metallic and amine polymerization promoters. Metallic promoters include salts of heavy metals, such as cobalt naphthenate, cobalt octoate, manganese octoate, ferric napthenate, cupric naphthenate, etc., and mixtures thereof. The amine promoters include dimethyl aniline, diethyl aniline, methyl ethyl aniline, etc., and mixtures thereof.

The foam composition of this invention also incorporates a blowing agent or agents selected from a class of liquid, inert organic compounds having boiling points from between 20° to 60° C. for the room temperature foaming operation.

As illustrative of such vaporizable, normally liquid blowing agents there may be mentioned those fluorinated hydrocarbons having boiling points substantially within the limits specified, collectively designated by the trade name "Freon," of which a suitable example falling within the specified limits is trichloromonofluromethane ($CCl_3F$), sometimes referred to as "Freon 11" or "F–11." The quantity of blowing agent may be varied within relatively wide limits but is preferably between 10–40%, or more desirably 10–30% by weight of the base mixture which includes all components. Such blowing agents are likewise employed in the process of our application Ser. No. 188,555, of which the present application is a continuation-in-part. The vapor formed by slightly heating the blowing agent causes bubbles to form with foam ensuing.

The use of a surface acting agent in the mixture is desirable in order to secure uniform foaming and a rising of the foam, rather than to allow the bubbles to break to the surface. Any suitable surface acting agent may be employed within the scope of the invention in its broadest aspects, such surface acting agents being well known to those skilled in the art. A preferred surface acting agent for the purpose of the present invention is one of a series of non-ionic agents manufactured by the Wyandotte Chemicals Corp., of Wyandotte, Michigan, under the trade name "Pluronic." These are polyoxyglycols prepared by the addition of ethylene oxide to polypropylene glycols.

Polyoxy glycols, from whatever source obtained, having the following structure are particularly suitable for the purpose of the present invention:

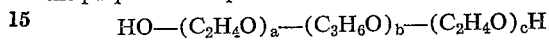

$$HO-(C_2H_4O)_a-(C_3H_6O)_b-(C_2H_4O)_cH$$

where the $a$ and $c$ portions constitute from 16–80% of the total weight.

Pluronic L–62, a product of Wyandotte Chemical Corp. (supra) was used as the surface acting agent in the examples to follow.

The constituents of the foam composition and the general range of their products and their functions are tabulated as follows:

| Compound | Range, percent | Function |
|---|---|---|
| Polyester resin | 90–40 | Base resin. |
| Maleic anhydride | 10–60 | Heat providing agent for vapor expansions and for quickening the gel of the polyester, aside from being an integral portion of the foam. |
| Styrene | 0–40 | Polymerizable monomer—to adjust viscosity for the correct consistency for foaming also as a co-monomer for the maleic anhydride. |
| Cobalt naphthanate | .05–4 | Polyester accelerator. |
| Blowing agent | 10–40 | Provides vapor for foam expansion. |
| Cab-O-Sil | .2–6 | To adjust viscosity and impart thixotropy to retard foam fall after expansion. |
| Surface active agent | ½–2 | To provide uniform cell size structure. |
| Peroxide catalyst | ½–5 | Polyester initiator. |

Cab-O-Sil is a trademark of Cabot Corp., Boston, Mass., and is defined in Reinhold's Condensed Chemical Dictionary, sixth edition, page 192, as a trade name for anhydrous and particulate colloidal silica; reinforcing, thixotropic, thickening and gelling, suspending, flatting, anticaking, antislip agent.

The following examples illustrate but do not limit the invention:

POLYESTER A

An unsaturated polyester base is prepared by charging the following expressed in mole ratio into a 3-necked, 5-liter flask, equipped with stirrer, thermometer, inert gas sparge, bubble cap column and heating mantle. The reactants are brought up to 200° C. and kept there until an acid number of about 30–40 is reached. At the termination of the condensation reaction the alkyd is brought down to about 180° C. and .008% hydroquinone is added to the alkyd. After the alkyd temperature has dropped to 160° C., it is thinned with styrene at a ratio of 70 parts alkyd to 30 parts styrene. The other polyesters formulated were treated in a like manner.

Mole ratio
Phthalic anhydride _____ 2.
Maleic anhydride _____ 1.
Propylene glycol _____ 3.3, 10% mole excess.

POLYESTER B

This unsaturated polyester resin is processed the same as Polyester A. Only the components have been changed.

| | Mole ratio |
|---|---|
| Phthalic anhydride | 1. |
| Maleic anhydride | 2. |
| Propylene glycol | 3.3 10%, mole excess. |

The alkyd was thinned in a ratio of 80 gm. alkyd to 20 gm. styrene.

POLYESTER C

| | Mole ratio |
|---|---|
| Maleic anhydride | .7. |
| Het acid | 1.3. |
| Ethylene glycol | 1.1 |
| Propylene glycol | 1.1, 10% mol excess. |

The alkyd was thinned in a ratio of 80 gm. alkyd to 20 gm. styrene. Het acid is also known as chlorendic acid and is employed to render the polyester fire resistant or flame retardant.

*Example 1*

A 200 ml. beaker equipped with a stirrer contained 100 gm. of Polyester A. To this was added ½% of 6% cobalt naphthante. The viscosity of the polyester resin was adjusted to 800 cps. A glass tube connected to a carbon dioxide line was secured so that a steady stream of gas bubbled through the polyester. Agitating was commenced and then 1% methyl ethyl ketone peroxide was added. After about 25 minutes the polyester gelled onto the stirrer without any foaming having occurred.

*Example 2*

The same procedure is followed as in Example 1 except for the omission of the gas sparge and the inclusion of 30 gm. of Freon 11. After about 30 minutes the polyester gelled, not having foamed.

*Example 3*

| Polyester A | gm | 70 |
|---|---|---|
| Maleic anhydride | gm | 30 |
| Freon 11 | gm | 30 |
| Pluronic L-62 | gm | 2 |
| 6% cobalt napthenate | percent | 1 |

The maleic anhydride was first melted and then added to the mixture. Once dissolved the maleic anhydride did not crystallize out upon cooling. A stirrer was lowered into a beaker containing the above mixture and mixing was continued for about 1 minute after 2 ml. of methyl ethyl ketone peroxide initiator was added. Then the stirring was terminated for fear of loss of too much Freon 11. After about 3–15 minutes foaming commenced with a very quick expansion and a high exothermic heat evolution. A very hard large bubbled blue white foam resulted. The heat from the reaction was found to be sufficient to vaporize the blowing agent (Freon 11) without the use of external heat.

*Example 4*

| Polyester A | gm | 70 |
|---|---|---|
| Maleic anhydride | gm | 30 |
| Freon 11 | gm | 30 |
| Pluronic L-62 | gm | 2 |
| 6% cobalt napthenate | percent | 1 |
| Cab-O-Sil | do | 2 |

The procedure followed is the same as in Example 3. The Cab-O-Sil, which was added to the polyester, increased the initial viscosity and also imparted thixotropy to the resin. After addition of 2% methyl ethyl ketone peroxide a foam ensued which had a smaller cell structure and a greater expansion than Example 3.

*Example 5*

This resin mix is the same as Example 3, with the substitution of Polyester B for Polyester A. This foam is more rigid and somewhat brittle as compared to Example 3.

*Example 6*

| Polyester B | gm | 60 |
|---|---|---|
| Styrene | gm | 8 |
| Maleic anhydride | gm | 20 |
| Freon 11 | gm | 20 |
| Cab-O-Sil | gm | 2 |
| Pluronic L-62 | gm | 1.5 |
| 6% cobalt naphthenate | percent | 1.3 |
| 50% hydrogen peroxide | ml | 1.5 |

The procedure used in similar to the previous foam example. A white very hard small celled foam was formed which has a 7–16 lb./cu. ft. density. At the onset of the exotherm the mix was stirred for about ½ minute and then the mix was poured into another receptacle where the foaming commenced.

*Example 7*

| Polyester C | gm | 70 |
|---|---|---|
| Styrene | gm | 10 |
| Maleic anhydride | gm | 15 |
| Freon 11 | gm | 15 |
| Pluronic L-62 | gm | 1 |
| 6% cobalt naphthenate | percent | .5 |
| Methyl ethyl ketone peroxide | do | 2 |

The resultant foam was held up to a lighted match. When removed from the flame source the foam quickly extinguished its flame. The foam did not support combustion.

What is claimed is:

1. A process for producing a cured resinous foam which comprises the steps of mixing a vaporizable blowing agent comprising a normally liquid, inert, organic compound having a boiling point between about 20° C. to 60° C. with a blend of
   (A) a mixture comprising (a) an unsaturated polyester resin of (1) polyhydric aliphatic alcohols and (2) dicarboxylic acids, wherein at least one member contains alpha beta ethylene unsaturation and (b) at least one polymerizable monomer containing carbon to carbon unsaturation and
   (B) a member of a group consisting of maleic anhydride maleic acid and a monoester of maleic acid and fumaric acid and its esters and mixtures thereof, and further incorporating a surface active agent, a promoter and a catalyst, whereby the blowing agent vaporizes due to the exothermic heat of the reaction and the mixture expands and cures in the expanded condition to a resinous foam.

2. The process of claim 7 wherein the blowing agent is trichloro monofluoro methane and comprises about 10–40% of the base mixture.

3. The process of claim 1 wherein the surface active agent is non-ionic and comprises a polyoxy glycol having the following structure:

$$HO-(C_2H_4O)_a-(C_3H_6O)_b-(C_2H_4O)_c-H$$

where the *a* and *c* portions constitute from 16–80 percent of the total weight of the non-ionic agent.

4. The process of claim 1 wherein the polyester promotor is cobalt naphthenate in the range of from .025–5% by weight of the base mixture.

5. The process of claim 1 wherein the weight ratio of A to B is between 95–5 to about 70–30.

6. The process of claim 1 wherein the catalyst is methyl ethyl ketone peroxide in the range of ½ to 3% by weight of the base resin mix.

7. The foamed composition of claim 6.

8. The process of claim 1 wherein the catalyst includes hydrogen peroxide.

9. The process of claim 9 where 50% hydrogen peroxide catalyst is employed in a range of .025–5% by weight of the base foam mixture.

10. The foamed resinous product of claim 9.
11. The foamed resinous product of claim 1.

References Cited by the Examiner

UNITED STATES PATENTS

| | | | |
|---|---|---|---|
| 2,514,141 | 7/1950 | Phillips | 260—2.5 |
| 2,577,281 | 12/1951 | Simon et al. | 260—2.5 |
| 2,653,139 | 9/1953 | Sterling | 260—2.5 |
| 2,739,134 | 3/1956 | Parry et al. | 260—2.5 |
| 2,861,910 | 11/1958 | Johnston et al. | 260—863 |
| 3,051,665 | 8/1962 | Wismer et al. | 260—2.5 |

FOREIGN PATENTS

| | | |
|---|---|---|
| 652,770 | 5/1951 | Great Britain. |
| 864,965 | 4/1961 | Great Britain. |

MURRAY TILLMAN, *Primary Examiner.*
LEON J. BERCOVITZ, *Examiner.*